Dec. 21, 1965 J. R. SIZELOVE 3,224,206

CONTOUR DESIGN FOR "CASCADING BY SHAPING" THERMOMAGNETIC DEVICES

Filed Nov. 23, 1964

INVENTOR
JOHN R. SIZELOVE

BY Harry A. Herbert Jr and Robert Kern Duncan
ATTORNEYS

United States Patent Office 3,224,206
Patented Dec. 21, 1965

3,224,206
CONTOUR DESIGN FOR "CASCADING BY SHAPING" THERMOMAGNETIC DEVICES

John R. Sizelove, Dayton, Ohio, assignor to the United States of America as represented by the Secretary of the Air Force Filed Nov. 23, 1964, Ser. No. 414,033
2 Claims. (Cl. 62—3)
(Granted under Title 35, U.S. Code (1952), sec. 266)

Figure 1:
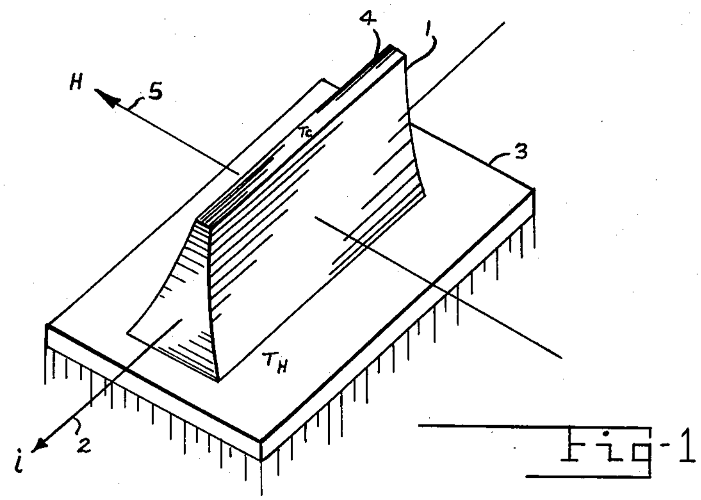

The invention described herein may be manufactured and used by or for the United States Government for governmental purposes without the payment to me of any royalty thereon.

This invention relates to an improved thermomagnetic cooling element and more particularly to the shaping of the structure cut from a single anisotropic, hexagonal, crystal of thermomagnetic material to provide an improved refrigeration device.

The thermomagnetic cooling is a transverse effect in a magnetic field. The electrons in metals and semimetals not only transport the current but also the heat. The electrons are deflected, as in a TV picture tube, by applying a magnetic field at right angles to the electric current giving a transverse electrical and thermal gradient. This transverse thermomagnetic phenomena is the Ettinghausen effect. The thermoelectric phenomena is the Peltier effect. Solid state thermoelectric elements have been used to spot cool infrared sensors and semiconductor power handling devices. Both of these types of solid state coolers (i.e., thermoelectric and thermomagnetic) have no moving parts and have long life; therefore, they have high reliability and require little maintenance.

To cover a larger temperature range thermoelectric elements have been cascaded by multistaging. Thermomagnetic elements may be cascaded by shaping. This gives physical and electrical simplicity in contrast to the complexity involved in the multistaging of thermoelectric cooling elements. The geometrical design for cascading the thermomagnetic device can be reduced to a control equation in $x$ and $y$ coordinates with the parameters of the applicable differential thermodynamic cooling equations expressed as functions of these dimensions. The resulting optimized equation is integrated to give the geometrical shape.

The heat load of the cooling device is increased by its internal $I^2R$ joule heating. A high current in a cascaded device rapidly limits the operating range since the excessive heat load decreases the cooling performance and increases the size and weight for a given amount of heat transfer. In previous thermomagnetic devices the current density has been optimized to give the maximum ratio between the heat input and the joule heating, with the assumptions that the Ettinghausen effect, the maximum temperature difference, and the current density are constants. The back E.M.F. was neglected. This has resulted in cooling elements having exponential cross sections defined in $x$–$y$ coordinates by equations such as:

$$y=Y_c\epsilon^{\frac{2Lx}{\Delta T_{\max.}}}$$

where:

$y$=the base length
$Y_c$=the cold surface length
$\epsilon$=the Napierian logarithm base
$L$=the thermal gradient
$x$=the height of the crystal
$\Delta T_{\max}$=the maximum temperature difference.

For a typical crystal element having a cold surface length in the cross-sectional plane of 0.1 unit, i.e, $Y_c=0.1$; a maximum temperature difference, $\Delta T_{\max}$, of 50° C.; a thermal gradient L of 100° C. per centimeter; the equation reduces to:

$$y=0.1\epsilon^{4x}$$

It has been found that a greatly improved cooling element may be constructed by treating the foregoing parameters that were considered constants, not as constants, but as temperature dependent variables, and to include the back E.M.F. effect. This has resulted in a comparable element having only a fraction of the base length of the prior exponentially-shaped elements.

It is, therefore, an object of the present invention to provide a thermomagnetic cooling element that will provide improved cooling efficiency.

It is another object of the present invention to provide a thermomagnetic cooling element that is relatively more rugged and easier to fabricate than previous thermomagnetic elements.

It is another object of the present invention to provide a thermomagnetic cooling element that is conservative of material.

It is another object of the present invention to provide a thermomagnetic cooling element that is efficient at cryogenic temperatures.

Figure 2:
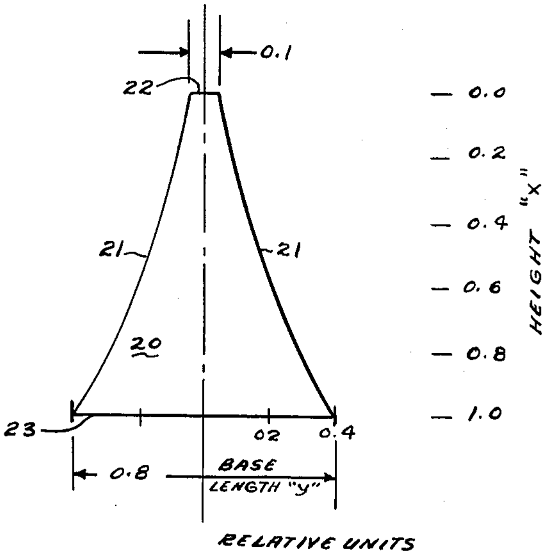

Additional objects and advantages will become apparent to those skilled in the art from the following description of an embodiment of the invention taken in connection with the accompanying drawings, in which FIG. 1 represents a perspective view of the cooling element in operation;

FIG. 2 is a cross-sectional view of an embodiment of the cooling element.

Referring to FIG. 1 the cooling element 1, possessing Ettinghausen effect characteristics, may be an anisotropic, hexagonal, single crystal of bismuth or bismuth-antimony grown by the zone-leveling technique, or it may be a series of anisotropic single crystals soldered together at joining planes that are perpendicular to the current flow axis 2 so that the individual crystals are connected in series with respect to the flow of current. Woods-metal or bismuth-tin solder is the preferred soldering agent. Final shaping of the cooling element may be performed after the soldering operation.

Crystal element 1 is mounted on heatsink 3 which is adjacent the high temperature side of the element. The temperature gradient occurs between the cooled surface 4 and the higher temperature surface which is in contact with the heatsink. Thus, heat is transferred from the cooled surface to the higher temperature surface where it is removed by the heatsink. Devices to be cooled are placed in contact with surface 4. Such devices may be infrared sensors or semiconductor power devices. In order to obtain the Ettinghausen effect a magnetic field represented by the vector 5, passes through the element at approximately right angles to both the current flow and the resultant heat flow. Optimum operation of the thermomagnetic cooling elements has been obtained by operating the heatsink at temperatures in the range of 70° K. to 200° K. The temperature of the heatsink may be maintained in this range by thermoelectric or other types of cooling devices or cooling baths such as the following three, with their respective temperatures enumerated.

| | |
|---|---|
| Boiling liquid nitrogen | 77° K. |
| Melting ethyl bromide ($C_2H_5Br$) (ethyl bromide is frozen with liquid nitrogen to form a thick slush) | 156° K. |
| Subliming $CO_2$ (crushed Dry Ice in an alcohol bath) | 195° K. |

In order to minimize convection heat-loading effects, cooling devices are quite frequently operated in a vacuum of $10^{-3}$ mm. Hg or better.

An embodiment of the new structure herein disclosed which results in a greatly improved cooling element is shown in FIG. 2. This is the improved shape of the cross section and ends of a crystal 20 of thermomagnetic material. The crystal is shaped from the cooled surface 22 to the base 23 (which rests on the heatsink) along the power expansion curve 21, which may be delineated mathematically in $x$–$y$ form by the expression:

$$y = Y_c \left[ \frac{T_c + Lx}{T_c} \right]^{1/n}$$

where:

$y$=the expansion of the base (length in cross section of the high temperature surface)
$Y_c$=the length in cross section at cold surface (22, FIG. 2)
$T_c$=the temperature of the cold surface (degrees Kelvin)
$L$=the temperature gradient
$x$=the distance along the gradient from the cold surface (height, measured in the plane of the temperature gradient)
$n$=the reduced Carnot efficiency.

For both thermoelectric and thermomagnetic, materials $n$ is defined as:

$$n = \frac{\omega - 1}{\omega + 1}$$

where $$\omega = (1 + ZT_c)^{1/2}$$

where Z is the conventional thermoelectric and thermomagnetic figure of merit for the material.

For a typical embodiment using a bismuth-antimony crystal the foregoing expression reduces to:

$$y = 0.1(1 + x)^3$$

where:

$Y_c$=0.1 unit
$T_c$=100° K.
$L$=100° K./cm.
$Z=3(10)^{-2}$

This results in the structure shown in FIG. 2. It may be seen that cooling elements of the shape shown in FIG. 2 depart but little from a trapezoidal shape. A trapezoidal cross section may be used and the performance will be degraded but little from the performance characteristic of the preferred shape.

In a specific embodiment of three anisotropic, hexagonal single crystals of bismuth-antimony (97% bismuth, 3% antimony) cut to the shape shown in FIG. 2, wherein the units represent centimeters, approximately a forty percent increase in cooling capacity has been obtained over previous exponentially-shaped elements, i.e., the cooling capacity changed from 0.1 watt per centimeter of crystal depth (perpendicular to plane of FIG. 2), to 0.14 watt per centimeter, with the same magnetic flux field. The heatsink was maintained at 200° K. and the cooled surface achieved and maintained a temperature of 100° K.

It will be understood that various changes in the details, materials, steps and arrangements of parts, which have been herein described and illustrated in order to explain the nature of the invention may be made by those skilled in the art within the principle and scope of the invention as expressed in the appended claims.

What is claimed:

1. A thermomagnetic cooling element cut from a single hexagonal crystal of anisotropic material of 90 to 97 percent bismuth the remainder being primarily antimony for use in a magnetic field with a current flowing through the said element at right angles to the magnetic field providing a thermal gradient at right angles to the magnetic field and the flow of current with a cooled surface and a higher temperature surface, the higher temperature surface being maintained at a temperature of 70° K. to 200° K. by a temperature maintaining heatsink, the said element having the contour in cross section in the plane of the temperature gradient represented by the expression, $$y = Y_c \left[ \frac{T_c + Lx}{T_c} \right]^{1/n}$$

wherein:

$y$=the expansion of the cross section of the base
$Y_c$=the length in cross section at cold surface
$T_c$=the temperature of the cold surface (degrees Kelvin)
$L$=the temperature gradient
$x$=the distance in the plane of the temperature gradient
$n$=the reduced Carnot efficiency.

2. A thermomagnetic cooling element having a temperature gradient between a cooled surface and a higher temperature surface comprising: a single crystal of thermomagnetic material having a cross-sectional contour along the said temperature gradient delineated by a power expansion from the cooled surface to the higher temperature surface represented by:

$$y = Y_c \left[ \frac{T_c + Lx}{T_c} \right]^{1/n}$$

wherein the symbols are as set forth in claim 1.

References Cited by the Examiner

UNITED STATES PATENTS 3,090,207 5/1963 Smith ________________ 62—3

FOREIGN PATENTS 227,571 3/1960 Australia.

OTHER REFERENCES

Publications:

"Ettinghausen Effect and Thermomagnetic Cooling," B. J. O'Brien and C. S. Wallace in Journal of Applied Physics, vol. 29, No. 7, pages 1010–1012; July 1958.

Oriented Single-Crystal Bismuth Nernst-Ettinghausen Refrigerators. T. C. Harmon, J. M. Honig, S. Fischler, A. E. Paladino and M. Jane Britton in Applied Physics Letters, vol. 4, No. 4, pages 77–79; February 1964.

"Theory of the Longitudinally Isothermal Ettinghausen Cooler, C. F. Kooi, R. B. Horst, K. F. Cuff and S. R. Hawkins in Journal of Applied Physics, vol. 34, No. 6, pp. 1735–1742; June 1963.

"Magnetothermoelectricity," Raymond Wolfe in Scientific American, vol. 210, No. 6, pages 70–82, June 1964.

WILLIAM J. WYE, *Primary Examiner*.